Oct. 15, 1929.   J. G. COFFIN   1,731,764
DISPENSING DEVICE
Filed Nov. 3, 1927
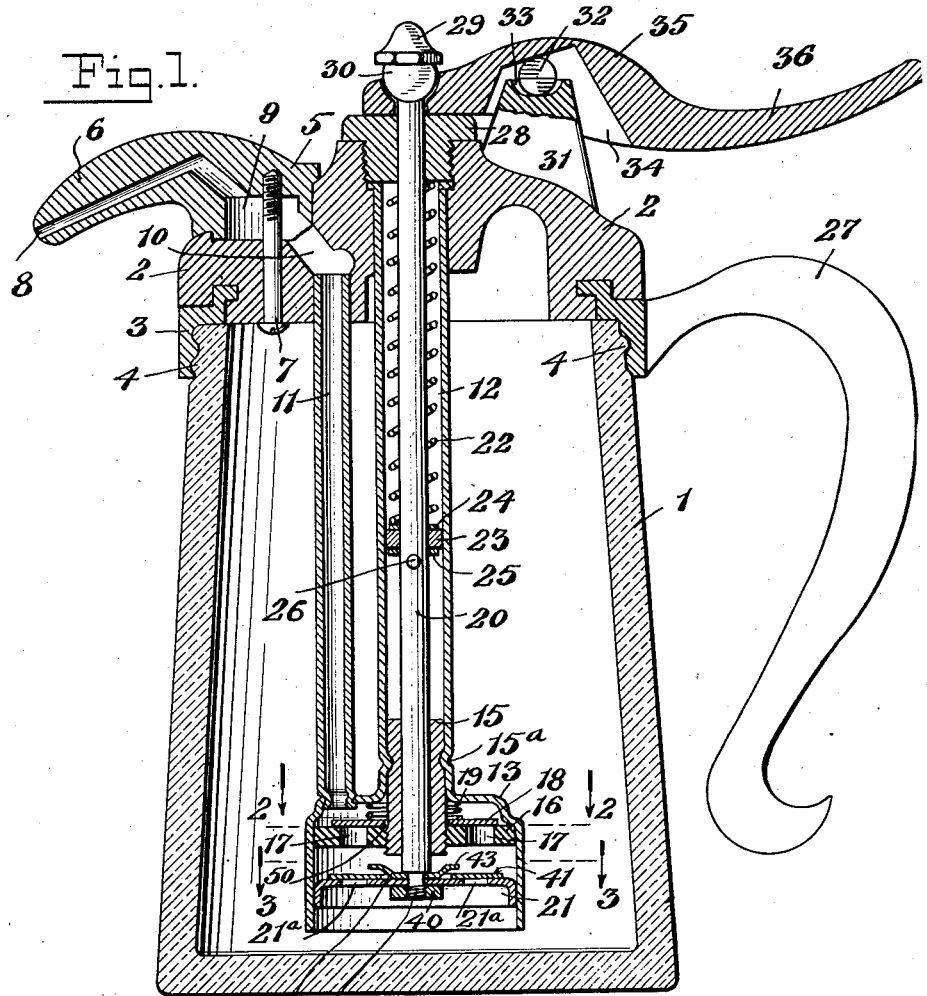
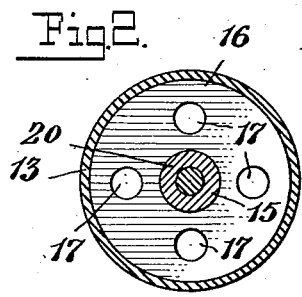
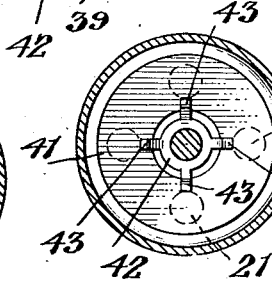
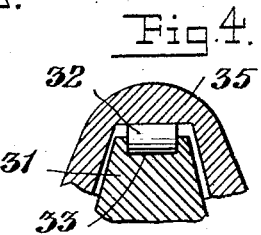
Inventor
Joseph G. Coffin
By his Attorney
Harry Radzinsky Patented Oct. 15, 1929

1,731,764

UNITED STATES PATENT OFFICE

JOSEPH G. COFFIN, OF NEW YORK, N. Y.

DISPENSING DEVICE

Application filed November 3, 1927. Serial No. 230,710.

This invention relates to a device intended for dispensing mustard, mayonnaise, food products of various kinds or any other viscous substances.

The object of the invention is to provide a sanitary dispensing device of this character, which will obviate the use of the insanitary containers now being generally used. It is well known that in restaurants, refreshment stands and other places, mustard is generally contained in open jars or similar containers which permit the air to reach the contents and cause the mustard to thicken or corrode about the mouth of the jar, at the same time permitting dirt and dust to have free access to the contents. The conditions usually cause the mustard container to assume an encrusted, insanitary and unappetizing appearance. The same is true of many other containers used for holding various kinds of food products.

One of the primary objects therefore, of my invention is to provide a container from which a desired amount of mustard, mayonnaise or other product can be dispensed when required and in which the contents of the container are kept covered and consequently are unaffected by air or exterior conditions.

Another object of this invention is to provide a small compact and neat device for dispensing products of the character mentioned, which device shall be positive in operation, which shall be entirely sanitary and which will require but little room upon a shelf, counter or table.

A further feature of my invention is found in the feeding means since it permits the mustard or similar product to be applied directly in the right quantity to articles of food such as sausages, sandwiches and the like, thus obviating the use of insanitary mustard encrusted spoons, sticks and the like.

With these objects and such other objects as may hereinafter appear, in view, I have devised the particular arrangements of parts hereinafter set forth and more definitely pointed out in the claims appended hereto.

Reference is to be had to the accompanying drawing, in which

Figure 1 is a vertical sectional elevation of my improved container and its operating parts;

Figure 2 is a sectional view on the line 2—2 of Figure 1, looking in the direction of the arrows;

Figure 3 is a sectional view on the line 3—3 of Figure 1, looking in the direction of the arrows; and Figure 4 is a detailed view showing the pivot for the operating lever.

Throughout the various views of the drawings, similar reference characters designate similar parts.

In the embodiment of my invention disclosed in the accompanying drawing, 1 indicates the body of the vessel or container, the same for sanitary purposes being made of glass, porcelain, china or some similar material. The open upper end of the container 1 is closed by a suitable cover member 2 which may be made of any suitable material, particularly a material which is unaffected by mustard or similar products. The cover 2 may be made of bakelite, which is suitable for the purpose and the same is connected to or formed integrally with a depending annulus 3, which is internally threaded to engage with threads 4 formed on the periphery of the container 1 near its open upper end.

At 5 is shown the dispensing spout which may be formed as part of the cover member 2 but which is, for convenience in construction, shown as being separate therefrom and is fitted into an opening in the cover to accommodate it. The spout 5 is firmly held in place by means of a screw 7 which passes through a part of the cover and threads into the body of the spout 5 as is clearly disclosed in Figure 1. Said spout 5 is provided with an outwardly and downwardly bent part or nose 6 which is so shaped as to direct the flow of mustard or other product down upon such article of food or the like as may be held below it. The spout 5 is provided with an outlet passage 8 which leads into a larger passage 9 from whence extends a smaller passage 10 that passes through the cover member 2. Said passage 10 leads into a downwardly extending vertical feed-tube 11. The passages 8, 9, 10 and the tube 11 cooperate to form a continuous exit or feed-passage for the mustard to be dispensed, as will be hereinafter explained.

At 12 is disclosed a vertical tube which is frictionally fitted in the cover member 2 and extends downwardly to a point near the bottom of the container 1, where it is enlarged to form an inverted cup shaped member 13. The upper end of the tube 12 is closed by a nut 28 which is threaded into the cover 2 as is disclosed.

It will be seen that the tube 11 has its lower end secured in the cup 13. At 15 is shown a plug which is fitted into the lower end of the tube 12 and closes said end, said plug being preferably held in place by inwardly distorted or pressed-in parts $15^a$ of the tube. The lower end of the plug 15 is threaded into a disk 16 which snugly fits within the cup 13, adjacent to its upper end and said disk is provided with a plurality of openings 17 to permit the passage of mustard. A check-valve is shown at 18 and the same consists of a flat plate which is provided with a central opening 50 through which the plug 15 loosely passes. Said valve plate 18 is of such size as to cover the perforations 17 and it is normally held thereover by means of a coil spring 19 which surrounds the plug 15 and is contained within the cup 13. The cup 13 is a fixed member and at 21 is shown a movable cup-shaped piston member which acts to force mustard up through the openings 17 in the disk 16 and consequently through the tube 11 and eventually through the passage-ways 10 and 9 and finally out through the spout passage 8.

The movable piston member 21 may be of substantially shallow cup-shaped form and it is provided with a series of perforations $21^a$. Said cup 21 is fixed on the lower end of a vertical rod or stem 20 that is provided with a reduced threaded end 39 that receives a nut 40. Said cup 21 is as heretofore explained fixed upon the end of the rod 20 and it is adapted to be reciprocated within the cup-shaped member 13 for the purpose of forcing mustard up through the opening 17 in the disk 16 and eventually out through the passages 11, 10, 9 and 8.

At 41 is shown a disk-shaped valve member which fits loosely about the rod 20 and normally lies over and closes the perforations $21^a$ in the piston 21. Upward movement of said disk 41 is restricted by means of a plate 42 that is fixed down upon the upper face of the piston 21 by being held under a shoulder on the rod 20 clearly disclosed in Figure 1. The plate 42 is provided with upwardly extending fingers 43 which lie over the upper surface of the disk 41. Thus when the piston 21 moves downwardly and mustard is being forced through the openings $21^a$ and the disk 41 is being lifted thereby, upward movement of said disk will be restricted by reason of the fact that said disk will come in contact with the fingers 43 so that said disk can raise a predetermined amount only.

The stem 20 passes up through the plug 15, through the tube 12, through the nut 28 and terminates in a ball member 30 which is surmounted by an acorn nut 29. The rod 20 is normally pressed downwardly by means of the coil spring 22, the lower end of said coil spring bearing against a washer 24, which, in co-operation with a similar washer 25 embraces a packing 23. At 26 is shown a pin which passes through the rod 20 and acts to support the washer 25, the packing 23 and the washer 24, said pin 26 therefore bearing the pressure of the spring 22. Thus, through the pressure of the spring 22, the piston 21 is normally pressed downward and away from the disk 16 in the position substantially disclosed in Figure 1. The purpose of the packing 23 in the tube 12 is to prevent the possible leakage of mustard up through the tube 12 and also to prevent mustard or other material from reaching the spring 22 to cause corrosion and possible breakage of it. Reciprocation of the rod 20 and consequently its attached piston 21 is effected by means of a lever 35. This lever 35 has an opening in its inner end through which the ball shaped part 30 of the rod 20 projects and it is provided with an outer projecting portion 36 intended to receive the pressure of the thumb of the user.

At 32 is shown the pivot member for the lever 35, such pivot member consisting of a small roller which loosely lies in a recess or depression 33 formed in the upper end of an upwardly extending projection 31 integrally formed on the top of the cover member 2. The recess 33 is substantially shallow and is of such size that the roller 32 may have some lateral movement. The lever 35 is provided with a recess 34 and this recess fits over the upper end of the projection or support 31 and encloses the roller 32. The roller is not connected to the lever 35 in any way, said lever simply resting upon the face of that part of the roller which projects above the upper end of its support 31.

From the foregoing, the manner in which my improved dispensing device operates will be readily understood. The device is made in a small convenient size and of neat construction so that it will be supported upon a table. To dispense mustard or such other substance as it may contain, the device is lifted by the handle 27 which is secured to and projects from the annulus 3. While the device is held in the hand by the handle 27, the outer end 36 of the lever 35 is pressed downward by the thumb. This causes the rod 20 to be raised, the same moving the cup member 20 upward.

When said cup-member or piston 21 moves upward, such mustard as is then located between said piston and the underside of the disk 16 is then forced up through the perfora tions 17. The valve plate 18 is raised by the upward pressure of the mustard which is then forced up through the tube 11 and the various passages 10 and 9 and finally out through the spout passage 8. When pressure on the lever 35 is released, the spring 22 acts to force the rod 20 and its attached piston member 21 downwardly, this action causing mustard in the container to be forced up through the openings 21ª in the piston member 21, the pressure of such mustard raising the valve disk 41, the mustard thus forced finally finding its way between the top of the piston 21 and the disk 16 ready for the next lifting action of the piston 21 to force it up through the openings 17 as was heretofore described.

It will be seen that the pivot member for the lever 35 is so arranged that through the medium of the roller 32 and recess 33, the lever 35 may have the necessary lateral shifting movement to permit the device to properly function without binding.

Through the medium of the valve mechanism described, an effective action is secured, which is particularly applicable for the dispensing of heavy viscous materials, such as mustard, mayonnaise and the like. It is well understood that mustard and similar preparations are very difficult to dispense, due to the various consistencies in which said various preparations are manufactured. The positive action of the piston member 21 within the cup 13 feeds the substance by pressure up through the perforations 17 to its final exit passage. This has been found very effective in dispensing mustard of different consistencies. It will be seen that the construction of the device is such that the contents of the vessel are completely enclosed, so that an entirely sanitary article is provided.

Having described my invention, what I claim is:

1. In a device of the class described, a container, valve means for dispensing substance from said container, a reciprocating member for actuating said valve means, a pivoted lever for reciprocating said member, and a pivot on which said lever rests, said pivot consisting of a roller resting freely in its support and mounted to have shifting movement relative to its support.

2. A mustard dispenser consisting of a container, a cover therefor, a handle projecting from and carried by said cover, a spout secured to said cover, pump means carried by said cover and projecting into the container, a reciprocating rod for actuating said pump means, a lever for actuating said piston rod, said lever having an end through which the upper end of said rod passes, a roller on which said lever rests, and a seat in the cover for said roller comprising an enlarged recess of a size capable of permitting bodily shifting movement of said roller.

3. A dispensing device for mustard and like materials comprising a container, a cover therefor, a dispensing spout extending from said cover and forming a continuation of a feed pipe which depends downwardly from the cover into the container, a tube extending downwardly from the cover member into the container, a piston member mounted to move therein, valve means associated with said piston member, a lever located on top of the cover member for actuating the piston, a recess in the under face of said lever, a freely movable roller mounted on top of said cover member and located in the recess in the under face of the lever.

Signed at the city, county and State of New York, this 29th day of October, 1927.

JOSEPH G. COFFIN.